(12) United States Patent
Liu (10) Patent No.: US 8,228,758 B2
(45) Date of Patent: Jul. 24, 2012

(54) IMAGE GENERATION OF A WELLBORE

(75) Inventor: RuiXia Liu, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 856 days.

(21) Appl. No.: 12/356,684

(22) Filed: Jan. 21, 2009

(65) Prior Publication Data

US 2010/0182313 A1 Jul. 22, 2010

(51) Int. Cl.
*G01V 1/40* (2006.01)
(52) U.S. Cl. ............................. 367/73; 367/25; 367/69
(58) Field of Classification Search .............. 367/73, 367/25, 69; 702/6, 9, 16
See application file for complete search history.

(56) References Cited

U.S. PATENT DOCUMENTS

| | | | |
|---|---|---|---|
| 7,136,510 B2 * | 11/2006 | Van Ginkel et al. .......... 702/6 |
| 7,302,373 B2 * | 11/2007 | Fleury et al. ................ 703/10 |
| 7,346,454 B2 * | 3/2008 | Mathieu et al. .............. 702/6 |
| 7,548,817 B2 * | 6/2009 | Hassan et al. ................ 702/9 |
| 7,647,182 B2 * | 1/2010 | Hassan et al. ................ 702/6 |
| 2010/0228484 A1 * | 9/2010 | Yin et al. ..................... 702/10 |

* cited by examiner

*Primary Examiner* — Ian Lobo
(74) *Attorney, Agent, or Firm* — Jianguang Du; Hoffman Warnick LLC (57) ABSTRACT

The present invention is a method of creating an image in a wellbore that includes receiving input data from a wellbore at one or more measured depths. The input data including geometry of wellbore, tool setting, survey data, trajectory of wellbore (button angle) etc. One dimensional arrays are constructed for a measured depth in one direction by a) calculating maximum positive amplitudes from input data and b) obtaining a sinusoidal line at a measured depth from the maximum positive amplitudes and assigning the sinusoidal line physical property. The calculations of a) and b) are repeated to obtain multiple arrays. A synthetic image is constructing from the multiple arrays and a synthetic image is outputted.

20 Claims, 6 Drawing Sheets

IMAGE GENERATION OF A WELLBORE

FIELD OF THE INVENTION

This invention relates to the petroleum industry and more particularly, to the generation of an image in a wellbore.

BACKGROUND OF THE INVENTION

Borehole images are widely used in the petroleum industry, especially to identify the geological structure of the sub-surface zones. Images based on the target geological model before and during drilling would be advantageous. For example, from images, a geologist can easily understand the dip and strike of the sub-surface and this information is very critical for designing or drilling a well. Also, the point where drilling occurs outside of a zone or drilling occurs into a new zone can be easily interpreted from an image. However, borehole images are not typically available.

The present invention provides images of wellbores that heretofore have not been available.

This present invention allows one to get useable synthetic images in a well bore.

SUMMARY OF THE INVENTION

The present invention is a method of creating an image in a wellbore that includes receiving input data from a wellbore at one or more measured depths. The input data includes geometry of wellbore, tool setting, survey data, trajectory of wellbore (button angle), etc. One dimensional arrays are constructed for a measured depth in one direction by a) calculating maximum positive amplitudes from input data and b) obtaining a sinusoidal line at a measured depth from the maximum positive amplitudes and assigning the sinusoidal line physical property. The calculations of a) and b) are repeated to obtain multiple arrays. A synthetic image is constructed from the multiple arrays and is outputted.

In another embodiment of the present invention a system for creating an image in a wellbore is provided. The system includes receiving input data from a wellbore at one or more measured depths. The input data includes geometry of wellbore, tool setting, survey data, trajectory of wellbore (button angle), etc. One dimensional arrays are constructed for a measured depth in one direction by a) calculating maximum positive amplitudes from input data and b) obtaining a sinusoidal line at a measured depth from the maximum positive amplitudes and assigning the sinusoidal line physical property. The calculations a) and b) are repeated. A synthetic image is constructed from the multiple arrays and is outputted.

In yet another embodiment of the present invention a computer readable medium storing computer instructions is provided. The instructions include receiving input data from a wellbore at one or more measured depths. The input data includes geometry of wellbore, tool setting, survey data, trajectory of wellbore (button angle), etc. One dimensional arrays are constructed for a measured depth in one direction by a) calculating maximum positive amplitudes from input data and b) obtaining a sinusoidal line at a measured depth from the maximum positive amplitudes and assigning the sinusoidal line physical property. The calculations of a) and b) are repeated. A synthetic image is constructed from the multiple arrays and is outputted.

BRIEF DESCRIPTION OF THE DRAWINGS

The present invention is illustrated by way of example and not intended to be limited by the figures of the accompanying drawings in which like references indicate similar elements and in which.

For a better understanding of the present invention together with other advantages and capabilities thereof, reference is made to the following detailed description and appended claims.

DETAILED DESCRIPTION

Synthetic images of the present disclosure are based on geometry theory. When a wellbore penetrates a geological zone, the zone plane cuts an intersection line on the wellbore cylinder. Open the wellbore from the top, the intersection line can be drawn as a sinusoidal curve along the track. Between each two sinusoidal lines, a color can be filled to reflect different physical properties between zone boundaries.

Figure 1:
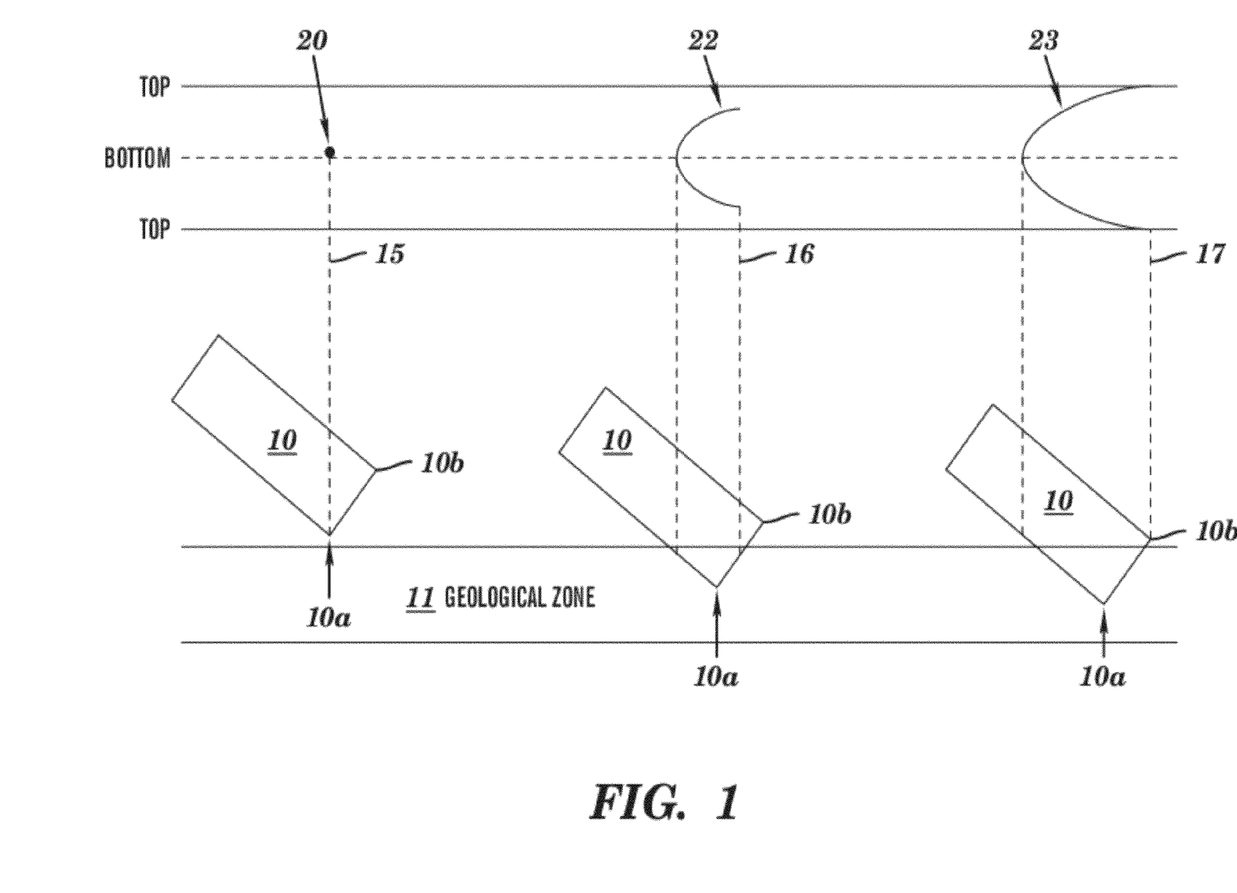
FIG. 1 shows a schematic diagram of a non-vertical wellbore sequentially as it penetrates geological zone.

The geometry is shown in FIG. 1, where from left-to-right a wellbore 10 is shown penetrating a Geological zone 11. The wellbore 10 is shown penetrating the Geological zone 11 at an angle, i.e., not vertical. In this case, the wellbore 10 first contacts the geological zone at the lower most portion 10a of the wellbore 10. The intersection line 15 of the wellbore with the geogical zone is a point 20. This is shown in the leftmost image of FIG. 1. In the middle image, the wellbore 10 has penetrated deeper into the geological zone, but the top 10b of the wellbore 10 has not penetrated the geological zone 11. In this case, the intersection line 16 of the wellbore with the geological zone is a sinusoidal line 22, that does not reach the top of the wellbore 10. Finally, in the rightmost image shows the wellbore 10 fully penetrating the Geological zone and the intersection 17 is a sinusoidal line 23 that reaches the top of the wellbore.

The geometry theory is straightforward, but to produce useable synthetic images in commercial software, simply applying the geometry equations will not work. Things like data structure, boundary conditions, abnormal handling, etc., need to be carefully considered and dealt with.

Synthetic images at one depth point can be calculated based on geometry theory. The following equations are used to obtain synthetic images.

Figure 2:
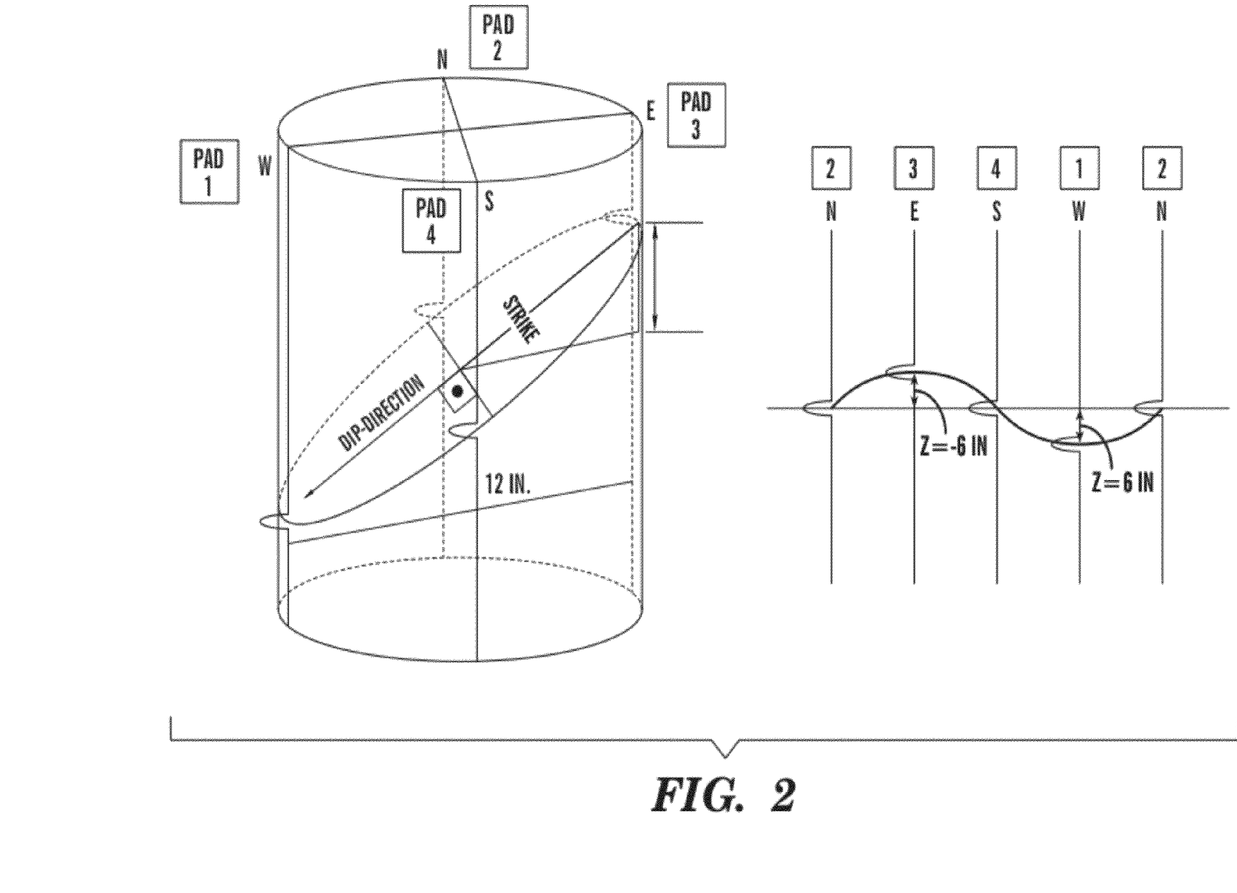
FIG. 2 shows an example of a vertical well and the associated definitions according to the present invention.

FIG. 2 shows an example of a vertical wellbore 10 having buttons or sensors (PAD1, PAD2, PAD3 and PAD4) located at various locations around the periphery of the wellbore 10. The geometry of the wellbore and the equations used are explained in more detail below. It is necessary to begin by assigning a position for a first sensor or button and then establishing the geometry and equations used in relation to the first sensor. In FIG. 2, PAD2 is assigned the north direction. From this the other sensors are assigned directions in relation the PAD2 as north. In FIG. 2, the four button angles are 270, 0, 90 and 180 for PAD1, PAD2, PAD3 and PAD 4 respectively. The radius of the well is 12 inches. The wellbore, although vertical has a strike angle for drilling, this is referred to as the surface dip. In FIG. 2 the western edge is the lowest and contacts the surface to be drilled first. In FIG. 2 both trajectory azimuth and deviation are 0 because it is vertical, surface dip is 27 degree (tan 27=6/12), surface azimuth is 270 (west direction).

Referring to FIG. 2, Equation 1 computes amplitude of the intersection sinusoid at t direction.

't' is the angle around the wellbore relative to the north direction, (See FIG. 2), e.g., button angle. In FIG. 2, four buttons or sensors are shown as PAD1 (t=270 degrees), PAD2 (t=0 degrees), PAD3 (t=90 degrees) and PAD4 (t=180 degrees). There can be more buttons or sensors, such as 16 or 56.

'r' is the radius of the wellbore.

Z is the amplitude of the sinusoidal intersection at t direction.

AAA is apparent dip between trajectory and surface in the North-South direction.

BBB is apparent dip between trajectory and surface in the East-West direction.

$$Z=r*(AAA*\cos(t)+BBB*\sin(t)) \quad \text{(Equation 1)}$$

Apparent dip between trajectory and surface in the North-South direction (AAA) and the East-West direction (BBB) are computed by following equations:

$$AAA=-AA/CC$$

$$BBB=-BB/CC, \text{wherein}$$

$$AA=(A*\cos(tAzi)+B*\sin(tAzi))*\cos(tDip)-\sin(tDip)$$

$$BB=-A*\sin(tAzi)+B*\cos(tAzi)$$

$$CC=(A*\cos(tAzi)+B*\sin(tAzi))*\sin(tDip)+\cos(tDip)$$

$$A=-\cos(pAzi)*\tan(pDip)$$

$$B=-\sin(pAzi)*\tan(pDip)$$

Where: tAzi: trajectory azimuth;
tDip: trajectory deviation;
pAzi: surface azimuth; and
pDip: surface dip.

In the graph on the right of FIG. 2, PAD2 or North is the reference position. The radius of the well is 12 inch, both trajectory azimuth and deviation are 0 because it is vertical, surface dip is 27 degree (tan 27=6/12), surface azimuth is 270 (west direction). So the Z value for PAD 3 (t=90) can be calculated:

$$A=-\cos 270* \tan 27=0$$

$$B=-\sin 270* \tan 27=\tan 27$$

$$AA=(0*\cos 0+\tan 27* \sin 0)*\cos 0-\sin 0=0$$

$$BB=-0*\sin 0+\tan 27* \cos 0=\tan 27$$

$$CC=(0*\cos 0+\tan 27* \sin 0)*\sin 0+\cos 0=1$$

$$AAA=-0/1=0$$

$$BBB=-\tan 27/1=-\tan 27$$

$$Z=12*(0* \cos 90-\tan 27*\sin 90)=12*(-\tan 27)=12*(-6/12)=-6$$

Figure 3:
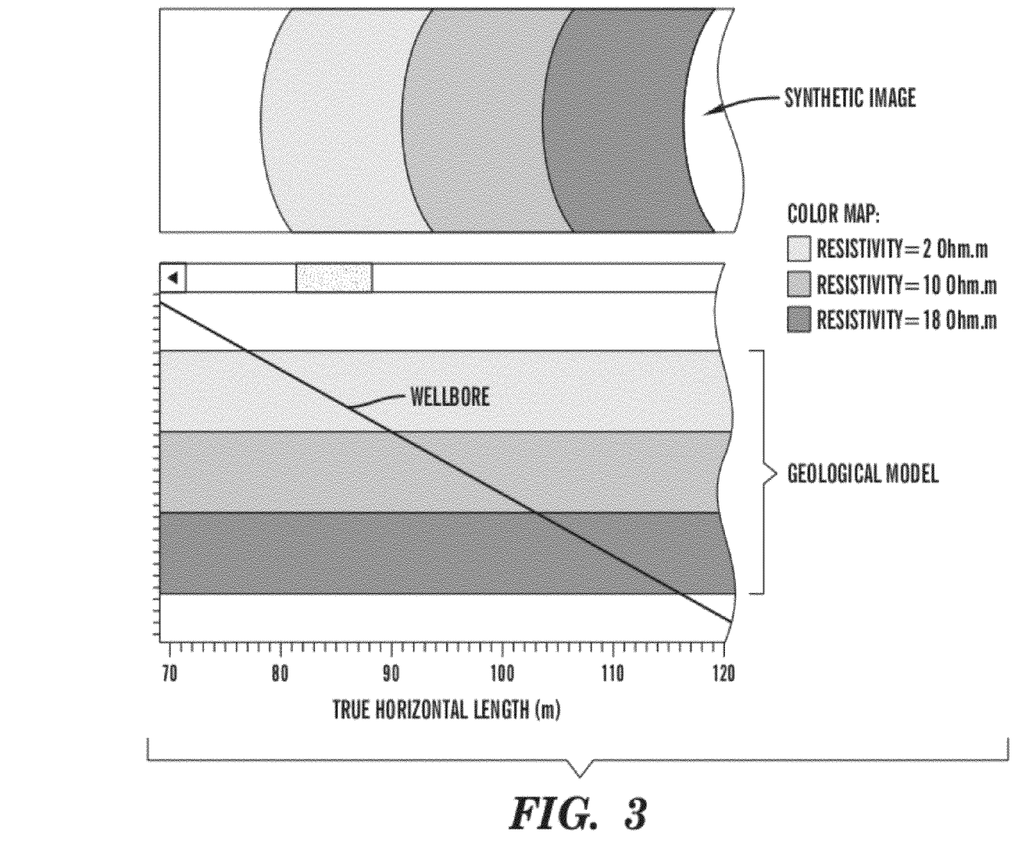
FIG. 3 shows an example of a synthetic image generated in accordance with the present invention.

A sinusoidal line can be composed of all amplitudes from all directions. Then for each MD (measured depth) along the wellbore, a sinusoidal line can be obtained. Between every two sinusoidal lines, physical properties at corresponding depths in the target geological model can be obtained and assigned with a map. FIG. 3 shows an example of a final result of a color map. It is a three layer geological model, the color map shows resistivity value in different layers. The same color from each layer is assigned to corresponding intervals between every two sinusoidal lines to indicate the resistivity value in synthetic image. The upper image shows the synthetic image of the series of sinusoidal lines and the lower image shows the horizontal distance of the wellbore as the wellbore passes through the geological zones. In practice, black and white can be used instead of color, although color images are preferred.

Figure 4:
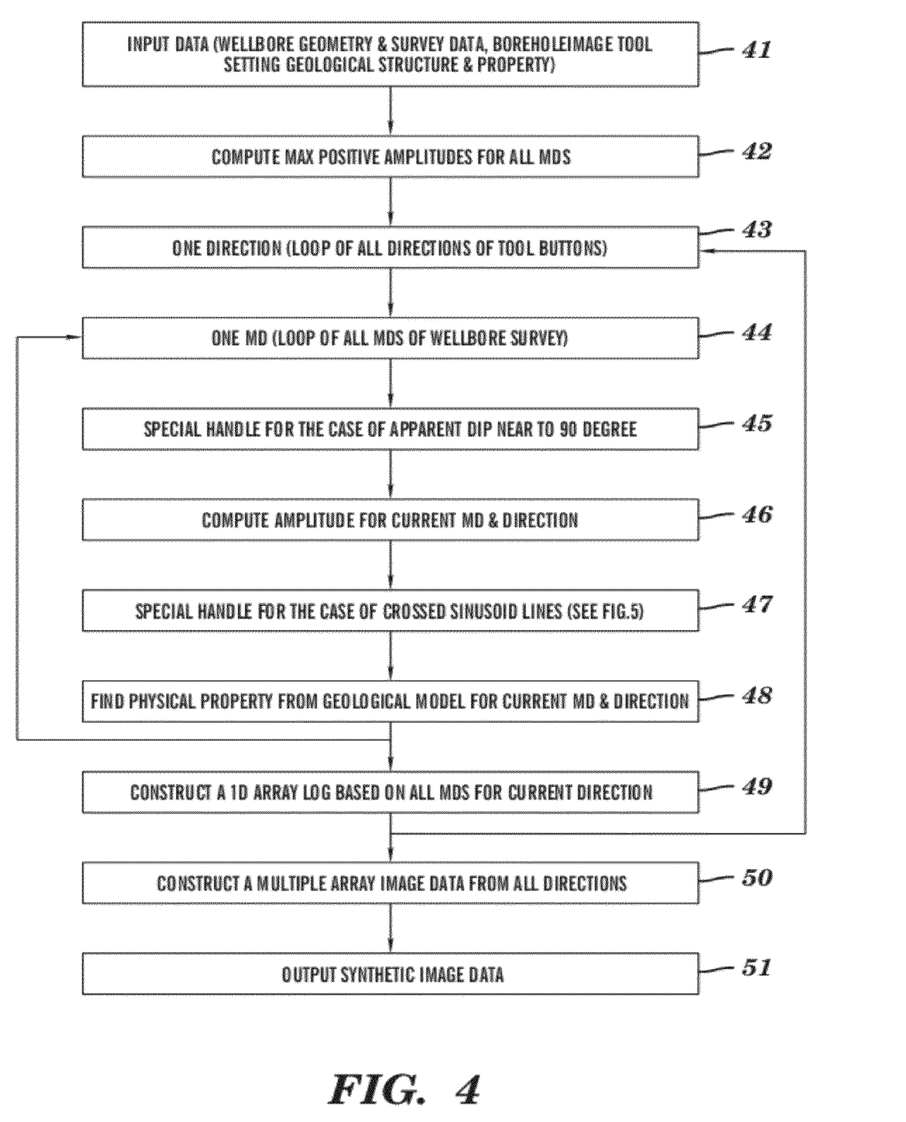
FIG. 4 shows the steps to create an image according to the present invention.
Figure 5:
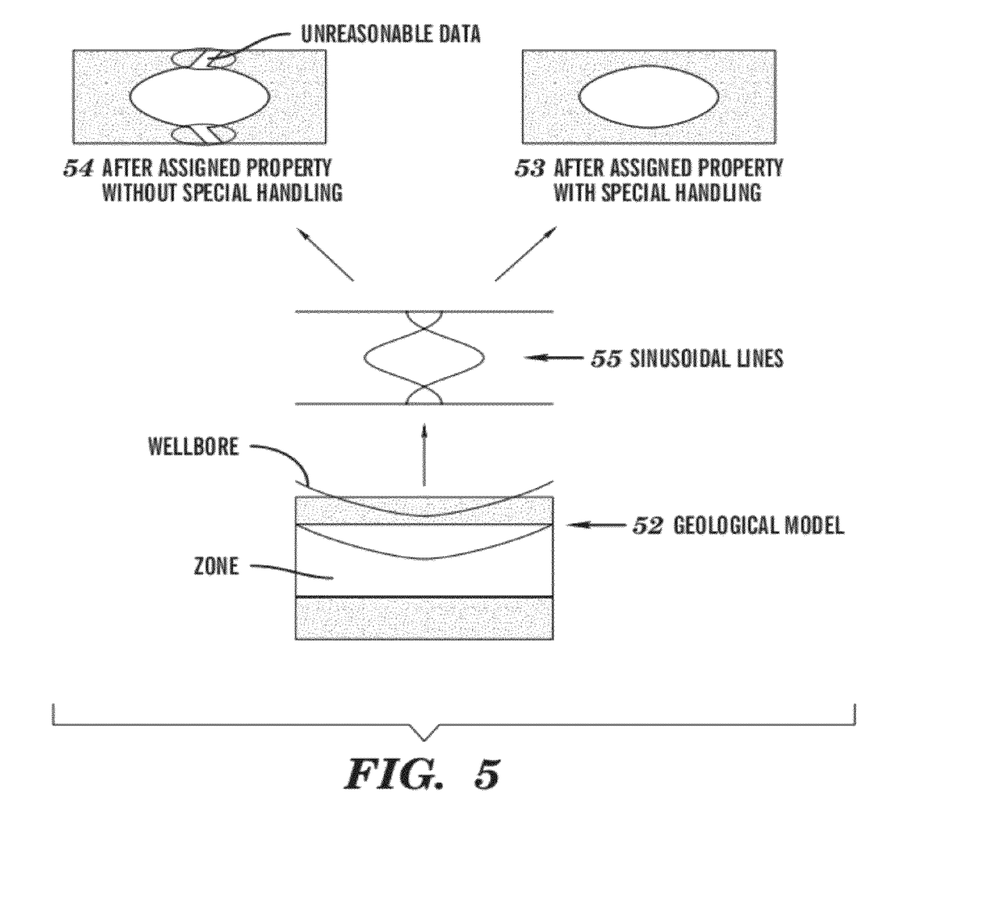
FIG. 5 shows the generation of an image before and after removing certain artifacts.

FIG. 4 shows the workflow steps on how a synthetic image is constructed. In FIG. 3, the generation of a synthetic image is achieved by inputting all the data concerning a wellbore (block 41, FIG. 4). This includes the wellbore geometry, number of buttons, or sensors positioned at different locations around the wellbore (FIG. 2 shows 4 buttons), the geological structure and physical property. The maximum positive amplitudes for all MDs are computed, block 42. The amplitudes are then calculated in one direction iteratively for a current MD (block 43) and then the calculation of amplitudes is done iteratively in all MDs (block 44). A computation is conducted in one direction and then a computation is conducted at one MD (block 46). Special cases, such as when the apparent dip between wellbore and surface is near 90 degrees i.e., the wellbore is almost horizontal to surface (block 45) and for the case where the computed sinusoidal lines cross each other (block 47), as described below with respect to FIG. 5, are handled by using the information from block 42 to eliminate unreasonable results. The algorithm loops for each MD (block 44). A one dimensional array log is then constructed for all MDs in one direction (block 49). The algorithm loops for all directions (block 43). A multiple image data array is constructed (block 50) and a synthetic image (block 51) is outputted.

To achieve this using a computer, some special cases and boundary conditions need to be handled. Otherwise the result is not meaningful. FIG. 5 shows one example. The generated image with and without special handling. The top left image in FIG. 5 shows the results of the synthetically generated image without accounting for the unreasonable results and the top right image show the corrected synthetic image after accounting for the unreasonable results. In this situation only part of wellbore penetrates into zone and then penetrates out of the zone. This is shown clearly in geological model 52. The computed sinusoidal lines 55 before going into the zone and after coming out of the zone cross each other and the crossed part needs to be handled to avoid a result that is not meaningful. The non-meaningful results are discarded and the results shown in 53 without the non-meaningful results. Without eliminating the non-meaningful results, the resulting image would look like 54.

Figure 6:
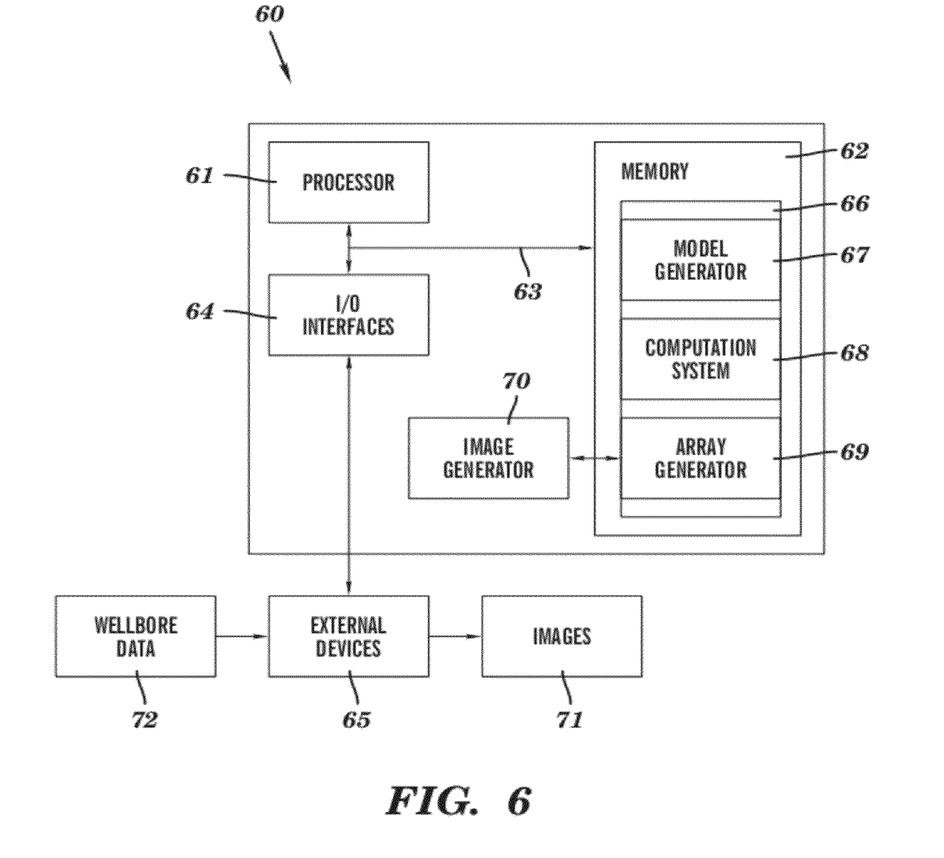
FIG. 6 is block diagram of a computer system used in an embodiment of the present invention.

The process described herein may be implemented on a computer system, as shown in FIG. 6, computer system 60 generally includes a processor 61, memory 62, bus 63, input/output (I/O) interfaces 64 and external devices/resources 65. Processor 61 may comprise a single processing unit, or may be distributed across one or more processing units in one or more locations, e.g., on a client and server. Memory 62 may comprise any known type of data storage, including magnetic media, optical media, random access memory (RAM), read-only memory (ROM), etc. Moreover, similar to processor 61, memory 62 may reside at a single physical location, comprising one or more types of data storage, or be distributed across a plurality of physical systems in various forms.

I/O interfaces 64 may comprise any system for exchanging information to/from an external source. External devices/resources 65 may comprise any known type of external device, including speakers, a CRT, LED screen, handheld device, keyboard, mouse, voice recognition system, speech output system, printer, monitor/display (e.g., display), facsimile, pager, etc.

Bus 63 provides a communication link between each of the components in computer system 60, and likewise may comprise any known type of transmission link, including electrical, optical, wireless, etc. In addition, although not shown, additional components, such as cache memory, communication systems, system software, etc., may be incorporated into computer system 60.

Shown in memory 62 is a synthetic imaging system 66 for generating images in accordance with the present invention, which may be provided as computer program product. Synthetic imaging system 66 includes model generator 67 for correlating physical properties from a geological model, a computation system 68 for calculating amplitudes for all MDs, and array generator 69 for constructing multiple arrays from the computation. An image generator 70 uses the generated array to construct synthetic image(s) which can be outputted to one on the external devices 65. The wellbore data is 72 is sent to computer system 60 and the s image 71 is outputted through I/O interfaces 64.

It should be appreciated that the teachings of the present invention could be offered as a business method on a subscription or fee basis. For example, computer system 60 could be created, maintained, supported, and/or deployed by a service provider that offers the functions described herein for customers. It should also be understood that the present invention can be realized in hardware, software or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

The invention has been described in detail with particular reference to certain preferred embodiments thereof, but it will be understood that variations and modifications can be effected within the spirit and scope of the invention.

I claim:
1. A method of creating an image in a wellbore comprising:
receiving input data from a plurality of sensors positioned along a periphery of a wellbore at one or more measured depths, said input data including geometry of the wellbore, survey data, and trajectory of the wellbore;
using a computer for:
i) constructing a plurality of one dimensional arrays for a measured depth in each direction by:
  a) calculating maximum positive amplitudes from said input data from the plurality of sensors at the measured depth in one direction; and
  b) obtaining a sinusoidal line at the measured depth from the maximum positive amplitudes and assigning to the sinusoidal line a physical property;
repeating a) and b) for each direction to obtain the plurality of one dimensional arrays for the measured depth in each direction;
ii) repeating i) for each of the one or more measured depths to obtain a plurality of one dimensional arrays for each of the one or more measured depths;
constructing an image from the multiple arrays using the computer; and
outputting the image using the computer.
2. The method of claim 1 further comprising:
determining whether the wellbore trajectory has a button angle of greater than 90 degrees and if so correcting the image using the computer.
3. The method of claim 2 wherein the correcting the image comprises discarding non-meaningful results.
4. The method of claim 1 wherein step b) includes using the equation:

$$Z = r*(AAA*\cos(t) + BBB*\sin(t));$$

wherein r is a radius of the wellbore;
Z is an amplitude of the sinusoidal intersection at t direction;

AAA is the dip between trajectory and surface in a North-South direction and is determined by:

$$AAA=-AA/CC$$

BBB is the dip between trajectory and surface in the East-West direction and is determined by:

$$BBB=-BB/CC,$$

wherein $AA=(A*\cos(tAzi)+B*\sin(tAzi))*\cos(tDip)-\sin(tDip),$ $$BB=-A*\sin(tAzi)+B*\cos(tAzi),$$

$$CC=(A*\cos(tAzi)+B*\sin(tAzi))*\sin(tDip)+\cos(tDip),$$

wherein $A=-\cos(pAzi)*\tan(pDip)$ and $B=-\sin(pAzi)*\tan(pDip);$ wherein tAzi is a trajectory azimuth, tDip is ae trajectory deviation, pAzi is a surface azimuth, and pDip is a surface dip.

5. The method of claim 1 further comprising:
removing a boundary condition if the wellbore trajectory partially penetrates into a geological zone using the computer.

6. The method of claim 1 wherein the plurality of one dimensional arrays for each of the one or more measured depths are associated with a physical property.

7. The method of claim 5 wherein the physical property is associated with a color in the image.

8. A system for creating an image in a wellbore comprising:
a plurality of sensors positioned along a periphery of a wellbore at one or more measured depths;
at least one computing device for;
receiving input data from the plurality of sensors at one or more measured depths, said input data including geometry of wellbore, survey data and trajectory of wellbore;
i) constructing a plurality of one dimensional arrays for a measured depth in each direction by
  a) calculating maximum positive amplitudes from said input data from the plurality of sensors at the measured depth in one direction;
  b) obtaining a sinusoidal line at the measured depth from the maximum positive amplitudes and assigning the sinusoidal line physical property;
repeating a) and b) for each direction to obtain the plurality of one dimensional arrays for the measured depth in each direction;
ii) repeating i) for each of the one or more measured depths to obtain a plurality of one dimensional arrays for each of the one or more measured depths;
constructing an image from the plurality of one dimensional arrays for each of the one or more measured depths; and
outputting the image.

9. The system according to claim 8 further comprising:
determining whether the wellbore trajectory has a button angle of greater than 90 degrees and if so correcting the image.

10. The system according to claim 8 wherein b) includes using the equation:

$$Z=r*(AAA*\cos(t)+BBB*\sin(t));$$

wherein r is a radius of the wellbore;
Z is an amplitude of the sinusoidal intersection at t direction AAA is a dip between trajectory and surface in a North-South direction and is determined by;

$$AAA=-AA/CC$$

BBB is a dip between trajectory and surface in ane East-West direction and is determined by:

$$BBB=-BB/CC,$$

wherein $AA=(A*\cos(tAzi)+B*\sin(tAzi))*\cos(tDip)-\sin(tDip),$ $$BB=-A*\sin(tAzi)+B*\cos(tAzi),$$

$$CC=(A*\cos(tAzi)+B*\sin(tAzi))*\sin(tDip)+\cos(tDip),$$

wherein $A=-\cos(pAzi)*\tan(pDip)$ and $B=-\sin(pAzi)*\tan(pDip);$ wherein tAzi is a trajectory azimuth, tDip is a trajectory deviation, pAzi is a surface azimuth, and pDip is a surface dip.

11. The system according to claim 8 further comprising:
removing a boundary condition if the wellbore trajectory partially penetrates into a geological zone.

12. The system according to claim 8 wherein the plurality of one dimensional arrays for each of the one or more measured depths are associated with a physical property.

13. The system according to claim 12 wherein the physical property is associated with a color in the image.

14. A non-transitory computer readable medium storing computer instructions which when executed by a computer, enables a computer to output an image, the computer instructions comprising:
program code for receiving input data from a plurality of sensors positioned along a periphery of a wellbore at one or more measured depths, said input data including geometry of the wellbore, survey data and trajectory of the wellbore;
i) program code for constructing a plurality of one dimensional arrays for a measured depth in each direction by:
  a) calculating maximum positive amplitudes from said input data from the plurality of sensors at the measured depth in one direction; and
  b) obtaining a sinusoidal line at the measured depth from the maximum positive amplitudes and assigning the sinusoidal line physical property;
program code for repeating a) and b) for each direction to obtain the plurality of one dimensional arrays for the measure depth in each direction;
ii) program code for repeating i) for each of the one or more measured depths to obtain a plurality of one dimensional arrays for each of the one or more measured depths;
program code for constructing an image from the plurality of one dimensional array for each of the one or more measured depths; and
program code for outputting the image.

15. The non-transitory computer readable medium of claim 14 further comprising:
program code for determining whether the wellbore trajectory has a button angle of greater than 90 degrees and if so correcting the image.

16. The non-transitory computer readable medium of claim 15 wherein the correcting the image comprises discarding non-meaningful results.

17. The non-transitory computer readable medium of claim 14 wherein b) includes using the equation:

$$Z = r*(AAA*\cos(t) + BBB*\sin(t));$$

wherein r is a radius of the wellbore;
Z is an amplitude of the sinusoidal intersection at t direction
AAA is a dip between trajectory and surface in a North-South direction and is determined by:

$$AAA = -AA/CC$$

BBB is a dip between trajectory and surface in the an East-West direction and is determined by:

$$BBB = -BB/CC,$$

wherein $AA = (A*\cos(tAzi) + B*\sin(tAzi))*\cos(tDip) - \sin(tDip),$ $BB = -A*\sin(tAzi) + B*\cos(tAzi),$ $CC = (A*\cos(tAzi) + B*\sin(tAzi))*\sin(tDip) + \cos(tDip),$ wherein $A = -\cos(pAzi)*\tan(pDip)$ and
$B = -\sin(pAzi)*\tan(pDip);$ wherein tAzi is a trajectory azimuth, tDip is a trajectory deviation, pAzi is a surface azimuth, and pDip is a surface dip.

18. The non-transitory computer readable medium of claim 14 further comprising:
program code for removing a boundary condition if the wellbore trajectory partially penetrates into a geological zone.

19. The non-transitory computer readable medium of claim 14 wherein the plurality of one dimensional arrays for each of the one or more measured depths are associated with a physical property.

20. The non-transitory computer readable medium of claim 19 wherein the physical property is associated with a color in the image.

* * * * *